United States Patent
May

(10) Patent No.: US 8,662,512 B2
(45) Date of Patent: Mar. 4, 2014

(54) RETRACTABLE TRUCK STEP WITH WIRELESS DOOR SENSOR

(76) Inventor: Richard P. May, Yorba Linda, CA (US)

( * ) Notice: Subject to any disclaimer, the term of this patent is extended or adjusted under 35 U.S.C. 154(b) by 71 days.

(21) Appl. No.: 13/307,371

(22) Filed: Nov. 30, 2011

(65) Prior Publication Data
US 2012/0139206 A1 Jun. 7, 2012

Related U.S. Application Data

(60) Provisional application No. 61/418,595, filed on Dec. 1, 2010.

(51) Int. Cl.
*B60R 19/00* (2006.01)
(52) U.S. Cl.
USPC .......................................... 280/166; 280/163
(58) Field of Classification Search
USPC .................. 280/163, 166, 154.1, 169; 701/52
See application file for complete search history.

(56) References Cited

U.S. PATENT DOCUMENTS

| | | | |
|---|---|---|---|
| 6,100,793 A * | 8/2000 | Dimou ........................ | 340/426.1 |
| 6,641,158 B2 | 11/2003 | Leitner | |
| 6,830,257 B2 | 12/2004 | Leitner | |
| 6,834,875 B2 | 12/2004 | Leitner et al. | |
| 6,938,909 B2 | 9/2005 | Leitner | |
| 6,942,233 B2 | 9/2005 | Leitner et al. | |
| 7,007,961 B2 | 3/2006 | Leitner et al. | |
| 7,055,839 B2 | 6/2006 | Leitner | |
| 7,081,916 B2 | 7/2006 | Schebel et al. | |
| 7,163,221 B2 | 1/2007 | Leitner | |
| 7,380,807 B2 | 6/2008 | Leitner | |
| 7,398,985 B2 | 7/2008 | Leitner et al. | |
| 7,413,204 B2 | 8/2008 | Leitner | |
| 7,487,986 B2 | 2/2009 | Leitner et al. | |
| 7,566,064 B2 | 7/2009 | Leitner et al. | |
| 7,584,975 B2 | 9/2009 | Leitner | |
| 7,692,542 B2 | 4/2010 | Outzs | |
| 2006/0214386 A1 * | 9/2006 | Watson ........................ | 280/163 |
| 2007/0194916 A1 * | 8/2007 | Hewitt et al. ............... | 340/545.6 |

* cited by examiner

*Primary Examiner* — John Walters
*Assistant Examiner* — James Triggs
(74) *Attorney, Agent, or Firm* — Kirk A. Buhler; Buhler & Associates

(57) ABSTRACT

Improvements using a wireless door sensor in each door to eliminate modifying a vehicle wiring and simplify installation of a retractable step and controller for the step. Up to four magnetic door sensors/transmitter are mounted on the edge of each door jamb. A magnet is mounted in the door jamb in proximity to the transmitter's magnetic sensor when the door is closed. The transmitter operates in a sleep mode until the sensor state changes. Upon door movement the transmitter sends an open status message to a receiver where the message data is stored and the controller determines the correct responses. If a door on either side is open the receiver engages the appropriate step motor and lowers the step. The step remains lowered until the receiver stops receiving messages indicating a door is closed or the transmitter on an open door has timed out ceasing transmissions.

20 Claims, 5 Drawing Sheets

RETRACTABLE TRUCK STEP WITH WIRELESS DOOR SENSOR

CROSS REFERENCE TO RELATED APPLICATION

This application claims the benefit of Provisional Application Ser. No. 61/418,595 filed Dec. 1, 2010 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates generally to a retractable/extendable step. More particularly, the present retractable step relates to a wireless signaling device located in or near a vehicle door to signal a vehicle step which is movable between a retracted or storage position and an extended position to provide a step to assist entry into the vehicle.

2. Description of Related Art Including Information Disclosed Under 37 CFR 1.97 and 1.98:

High ground clearance vehicle such as trucks, SUV's and four wheel drive vehicle typically create a problem for people to get into because the distance between the ground and the floorboard of the vehicle can be great. To reduce the height of the step, fixed running boards are often installed. While the fixed running board makes entry into the vehicle easier the fixed running board defeats the purpose of the vehicle having high ground clearance. Another solution is to provide an extendable/retractable step. These steps are usually wired to the door switch of the vehicle to extend and retract the step based upon the status of the door switch. Wiring the step into the vehicle usually requires removal of door or interior panels to gain access to the switch wiring. Car dealers and new vehicle owners are often apprehensive to have modifications made to the interior of their new vehicles and possibly voiding the new car warranty. There is a need to provide a step signaling mechanism that minimizes disassembly of the interior of a vehicle. Some patents have been published and issued on systems that describe signaling systems to extend and retract a truck step. Exemplary examples of patents covering these products are disclosed herein.

U.S. Pat. Nos. 6,942,233, 7,398,985, 7,413,204 and 7,584,975 issued to Horst Leitner disclose Retractable Vehicle Steps. These retractable vehicle steps require the installer to cut into the electrical system of a vehicle to obtain power for the retractable step and also require the installer to connect into the door switch on all the doors where the step will be extended. This requires running a significant amount of wiring to each door, to a controller and to the extension mechanism. Some of these patents also disclose using the key fob that unlocks the door to extend a step. While these patents disclose an extendable and retractable step, they either rely upon wiring the system into a door switch or the key fob that can leave a step extended until some signal that retracts the step(s).

U.S. Pat. No. 7,081,816 issued Jul. 25, 2006 to Dean David Schebal et al., discloses a Compact Wireless Sensor. The sensor is for placement in a door or window and sends a signal when the door or window is opened. The signal does not activate a step to extend or retract and further does not send a complimentary signal to indicate when the door or window has been closed. The device uses a timer to sample the state of the sensor and send updated information only when the timer initiates a reading and the status changes. This sensor is configured for installation within a wood door jamb and is not configured for installation into an automotive door.

U.S. Pat. No. 7,692,542 issued Apr. 6, 2010 to Allan Outzs discloses a Door Position Monitor that couples a magnetic field through the door to determine the status of the door. The sensor uses a wired connection to a magnetic reed switch to determine the status of the door. While this patent determines the status of the door it does not transmit a wireless signal to activate a step for entry or exit from a vehicle.

What is needed is a wireless sensor that can be glued, bonded or otherwise secured to or near a door of a vehicle to determine when a door is opened or closed to signal a step to extend or retract the step based upon the status of the door. Accordingly, a wireless sensor and transmitter to operate a vehicle step which overcomes the above-stated problems is desired.

BRIEF SUMMARY OF THE INVENTION

It is an object of the retractable truck step with wireless door sensor to signal a motor to extend and retract a step on an elevated vehicle. The automatic vehicle entrance and exit step lowers for use when a vehicle door is opened and retracted when the door is closed. The step is placed at an intermediary height between the ground and the floorboard of the elevated vehicle. A typical installation hardwires the motion of the step with the door switch.

It is an object of the retractable truck step with wireless door sensor to use a wireless signal to trigger the drive motor to extend or retract the step. The wireless system makes installation of the retractable truck step easier by eliminating opening door, side or door sill panels to gain access to the door switch. Each door switch must be connected to move the steps separately on each side of a vehicle.

It is an object of the retractable truck step with wireless door sensor for the sensor to operate in a sleep mode while it is not transmitting a signal. The sleep mode reduces power consumption and the wireless transmitter only turns on when the door is opened to extend the step. The step is retracted when either the door is closed or a five minute door open timeout is reached.

It is an object of the retractable truck step with wireless door sensor to use a redundant signal to extend and retract the step. The use of redundant signaling virtually eliminates the potential for operation of the step from stray signals or noise that is generated from mechanical noise or other wireless transmitters.

It is another object of the retractable truck step with wireless door sensor for the door sensors to be positioned at a plethora of locations on the door(s). Because the sensor is wireless it can be placed in a location that creates minimal cosmetic impact and protection from damage. The wireless feature allows installation to be performed by simply bonding, gluing or otherwise securing the sensor to each door. This can be performed in less than a minute instead of the up to an hour to locate and install on a vehicle with multiple door sensors.

It is still another object of the retractable truck step with wireless door sensor to use multiple command identifiers to differentiate one vehicle from another. The use of multiple ID codes reduces the potential of opening a door on a first vehicle and having the step of a second vehicle extend unexpectedly.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

The Power Board is an automatic vehicle entrance and exit step that lowers for use when a vehicle door is opened and retracted when the door is closed. Traditional installation of the board requires modification of the vehicle to gain access to the door light switch wiring to sense door movement. Wiring is installed that accesses the vehicle wiring and is routed to a controller in the vehicle engine compartment. The controller engages the step motors to lower and retract the step.

Figure 1:
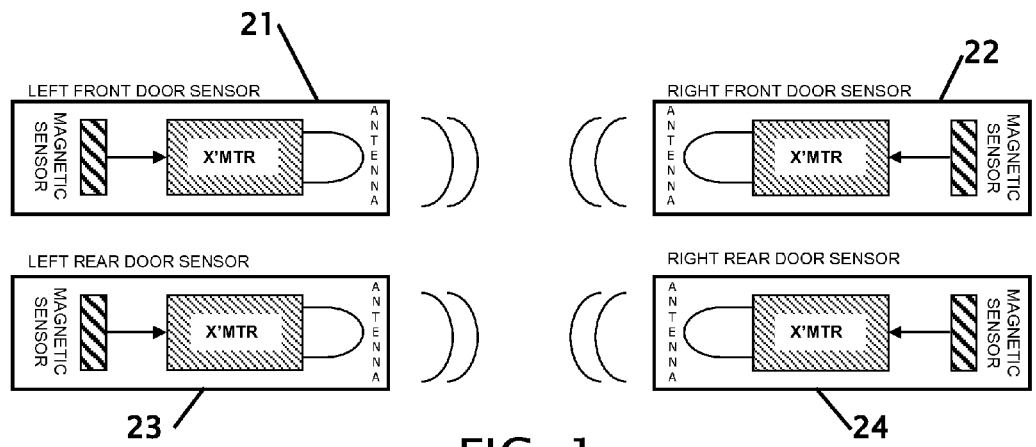
FIG. 1 shows four wireless door sensors.
Figure 2:
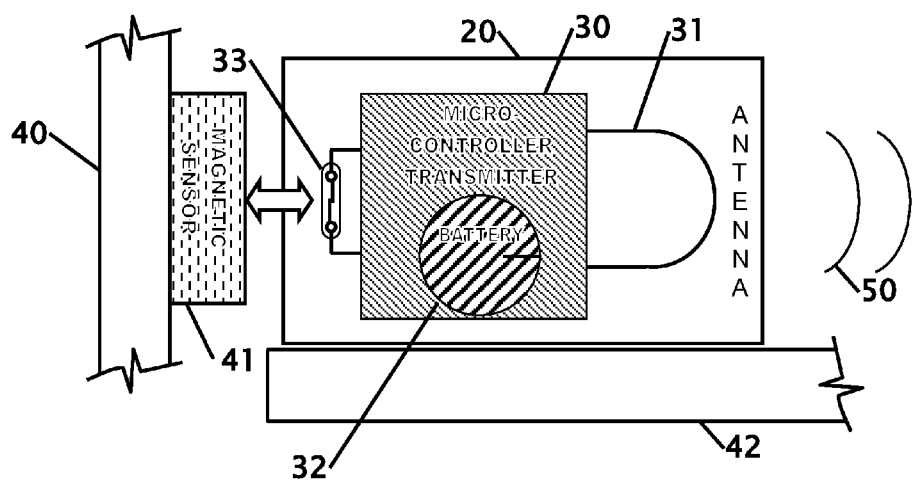
FIG. 2 shows a detailed view of the wireless door transmitter.

FIG. 1 shows four wireless door sensors. A wireless car door sensor system eliminates the need to modify the vehicle wiring and simplify the installation of the power board is comprised of door sensors 21-24 installed on each door. For vehicles with only two doors, only a single left and right door sensor will be used. FIG. 2 shows a more detailed view of the internal and external components used in the sensor/transmitter.

FIG. 2 shows a detailed view of the wireless door transmitter. Each door sensor 20 consist of transmitter 30 coupled with reed switch 33 having contacts that are effected by the presence or absence of a magnetic field caused by a magnet 41 or a ferric material near the magnetic field. The magnet 41 or the magnetic sensor 20 is mounted on the edge of each door 42 opposing the door jamb 40. A magnet 41 is mounted in the door jamb 40 that comes in close proximity to the transmitter's magnetic sensor 33 when the door 42 is closed. The effective range of most reed switches 33 is one inch or less and is based upon the strength of the magnetic field that is created or coupled by the magnet 41. This figure and the description show and describe a preferred embodiment for orientation, location and placement. Other embodiments are also contemplated that will provide the equivalent result of signaling when a car door has been opened and closed. The method of securing the transmitter 20 and or the magnet 41 can be as simple as tucking the components under body panels to gluing, bonding or screwing the components to a vehicle.

Figure 3:
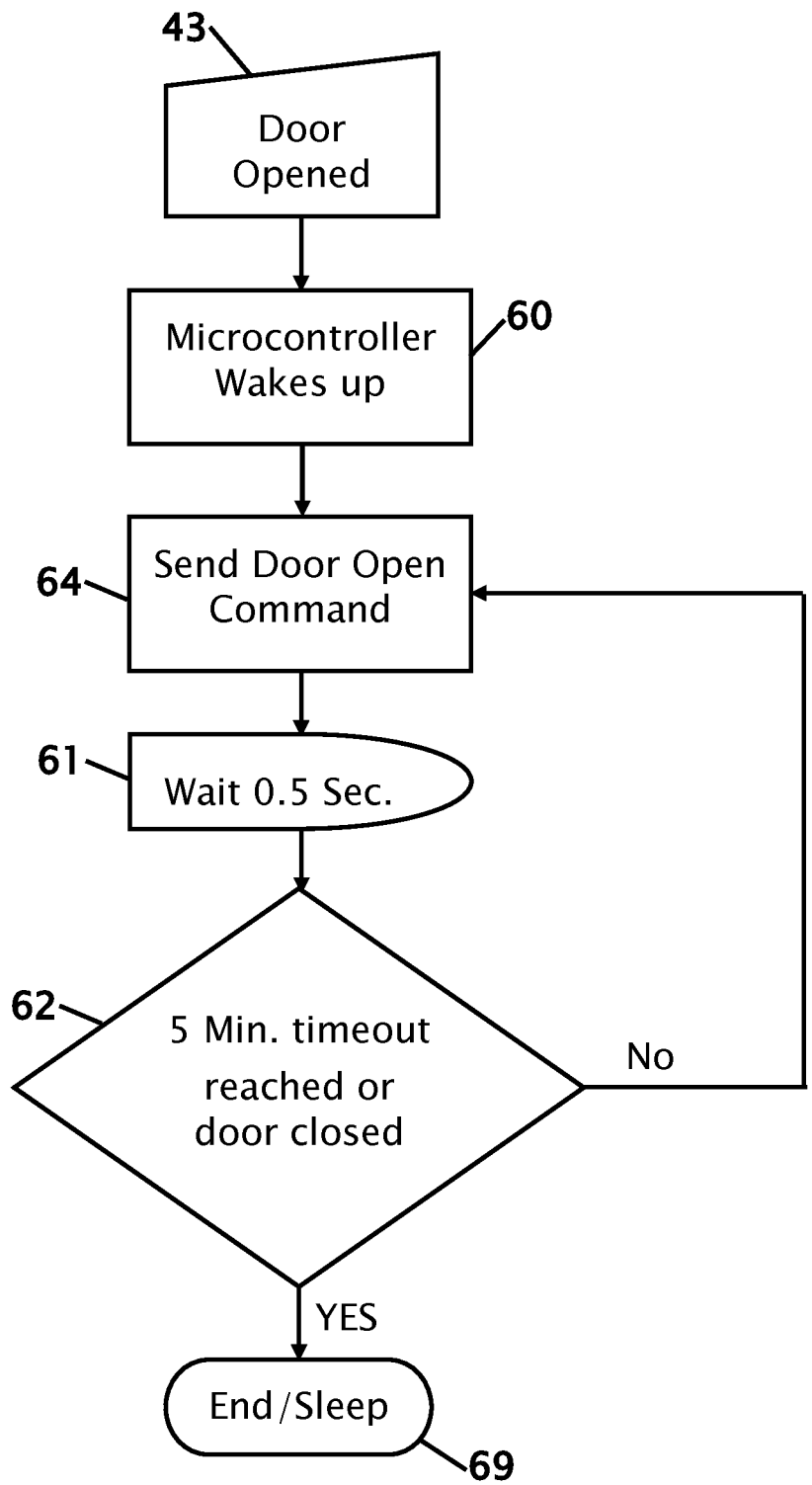
FIG. 3 shows a block diagram of the code flow chart in the transmitter.

A battery 32 is included with the transmitter 20 along with an antenna 31 that transmits 50 a signal based upon the status of the sensor 33. The transmitter 20 operates in a low power sleep mode until the magnetic sensor 33 senses a movement of the magnet 41. FIG. 3 shows a flow chart of the general operations within the microcontroller-transmitter 40.

FIG. 3 shows a block diagram of the code flow chart in the transmitter. The transmitter operates in a low power sleep mode until a door is moved 43. Since the sensing distance of the preferred reed switch sensor is limited, the detection of movement of the door is generally limited to motion when a door is just being opened and when the door latches shut. The opening and closing of the door 43 changes the status of the sensor and wakes up 60 the microcontroller from sleep. After the microcontroller wakes up 60 it will detect the status of the door and determine if the door is opened or closed. If the door is opened 43 the microcontroller will initiate the transmission of door open messages 64. If the door is now closed 62 the microcontroller will cease open door message transmissions. After the opened 64 command has been transmitted the microcontroller will repeat open door messages on a 0.5 second interval 61 until either the door is closed or a five minute time out period is reached after which the microcontroller will re-enter the sleep mode. While in the preferred embodiment a 5 five minute time out period is used it is contemplated that the time out period can be between one minute and 15 minutes. Various methods and frequencies of data transmission are contemplated including but not limited to frequencies that are utilized by car locking devices and garage door remote controls. While a 0.5 interval is preferred as a dead man type device to ensure that the door is still open an interval as small as 0.1 seconds to as long as 5 seconds between transmissions is contemplated. These frequencies are typically 315~915 MHz. One contemplated transmission protocol is shown and described with FIG. 4.

Figure 4:
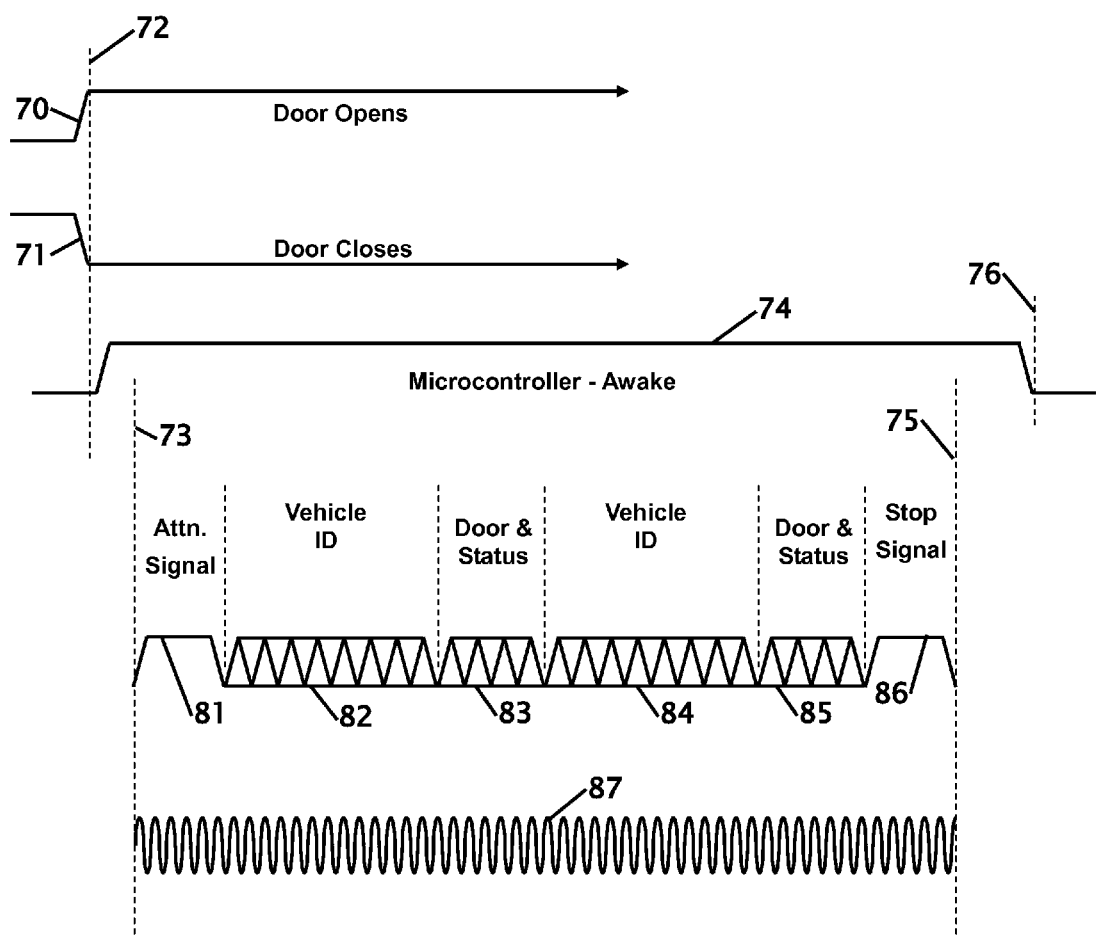
FIG. 4 shows the wireless data transmission from a transmitter.

FIG. 4 shows the wireless data transmission from a transmitter. While this data transmission protocol shows a particular order for the transmission various other baud rates, start bit(s), stop bit(s), command orders and redundant commands are contemplated. In one preferred embodiment the opening 70 or closing 71 of a door will change the status of the sensor and trigger 72 the microcontroller to awaken 74. The microcontroller will determine the status of the door sensor switch and turn on the transmitter to begin 73 transmission of the signal. The sine wave 87 of the transmission frequency is shown for reference, but the preferred embodiment uses a transmission frequency is 915 MHz Other frequencies are contemplated but these frequencies are generally preferred for transmissions of short bursts of data and have a range of several hundred feet or less.

The transmission of the data begins with an attention or start bit(s) signal 81. The data then includes a vehicle ID 82. It is contemplated that the vehicle ID will include options of 100 to 256 vehicles to reduce the possibility that opening the door of a first vehicle will inadvertently extend the step of both the desired first vehicle and an undesirable second vehicle. The data also includes a status indicator of the door and the status of the door 83. To reduce the possibility of a step extending or retracting with a stray signal from a car door being unlocked or a garage door being opened a redundant vehicle ID 84 and door status 85 is transmitted. The order of these commands as well as the second set of commands being inverted are contemplated to reduce the possibility of a step extending or retracting at an undesirable time. It is also contemplated that the transmitted signal includes a check sum. After the transmission of command data has been sent the transmitter will send a stop command 86 or will remain silent for some period of time while the transmitter is turned off 75 and the microcontroller ensures the status of the door is unchanged (67 from FIG. 3). The microcontroller will then return to a low power sleep mode 76.

Figure 5:
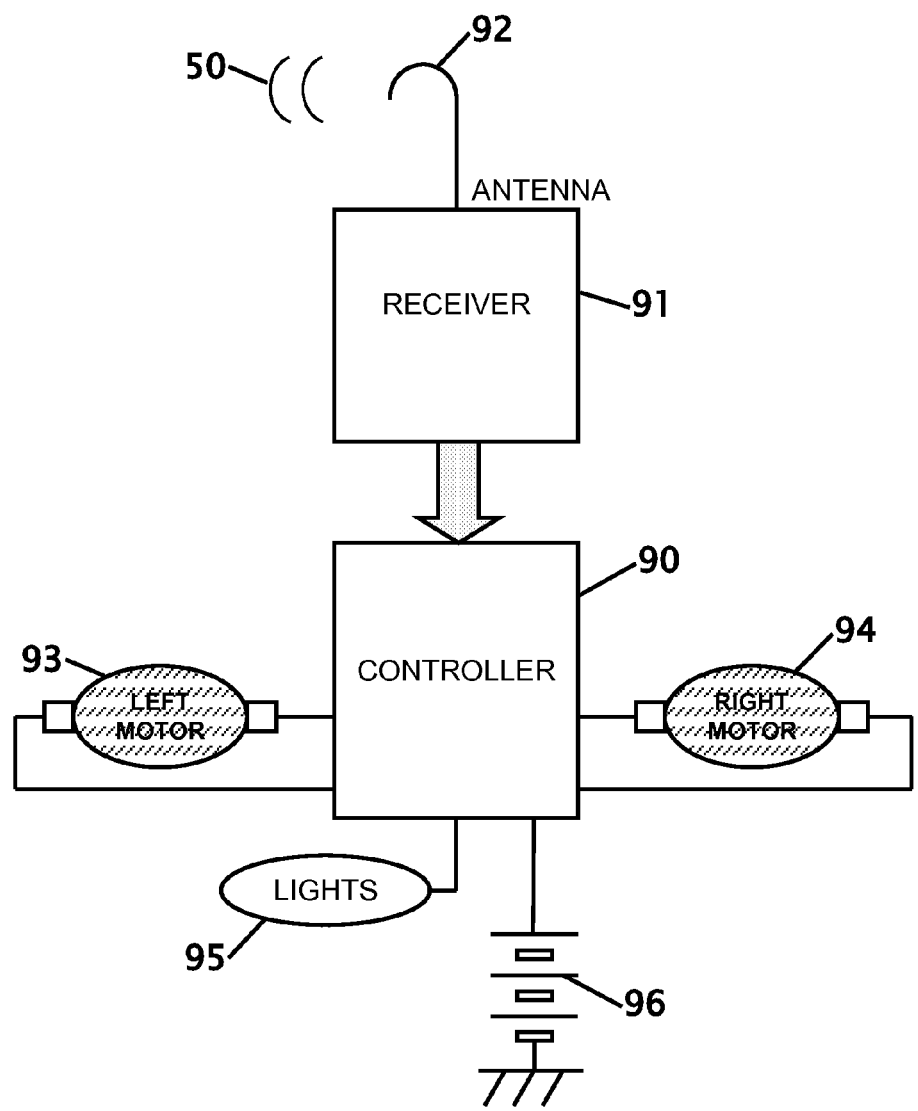
FIG. 5 shows block diagram of the receiver unit and the step controller motors.

FIG. 5 shows block diagram of the receiver unit and the step controller motors. The receiver 91 receives the wireless command 50 from an antenna 92 and communicates the decoded command to a controller 90. In one contemplated embodiment the receiver 91 includes one or a plurality of contacts that simulate the car door sensors opening and closing using solid state or mechanical relays. In this contemplated embodiment an existing controller 90 receives and acts upon equivalent contact closures that would be detected from the closures being hard wired to the door switches or a vehicle. The receiver 91/controller 90 is typically installed in the vehicle engine compartment or underneath the vehicle where it is wired to the electrical system and battery 96 to power lights 95, the left 93 and or right 94 motors.

Figure 6:
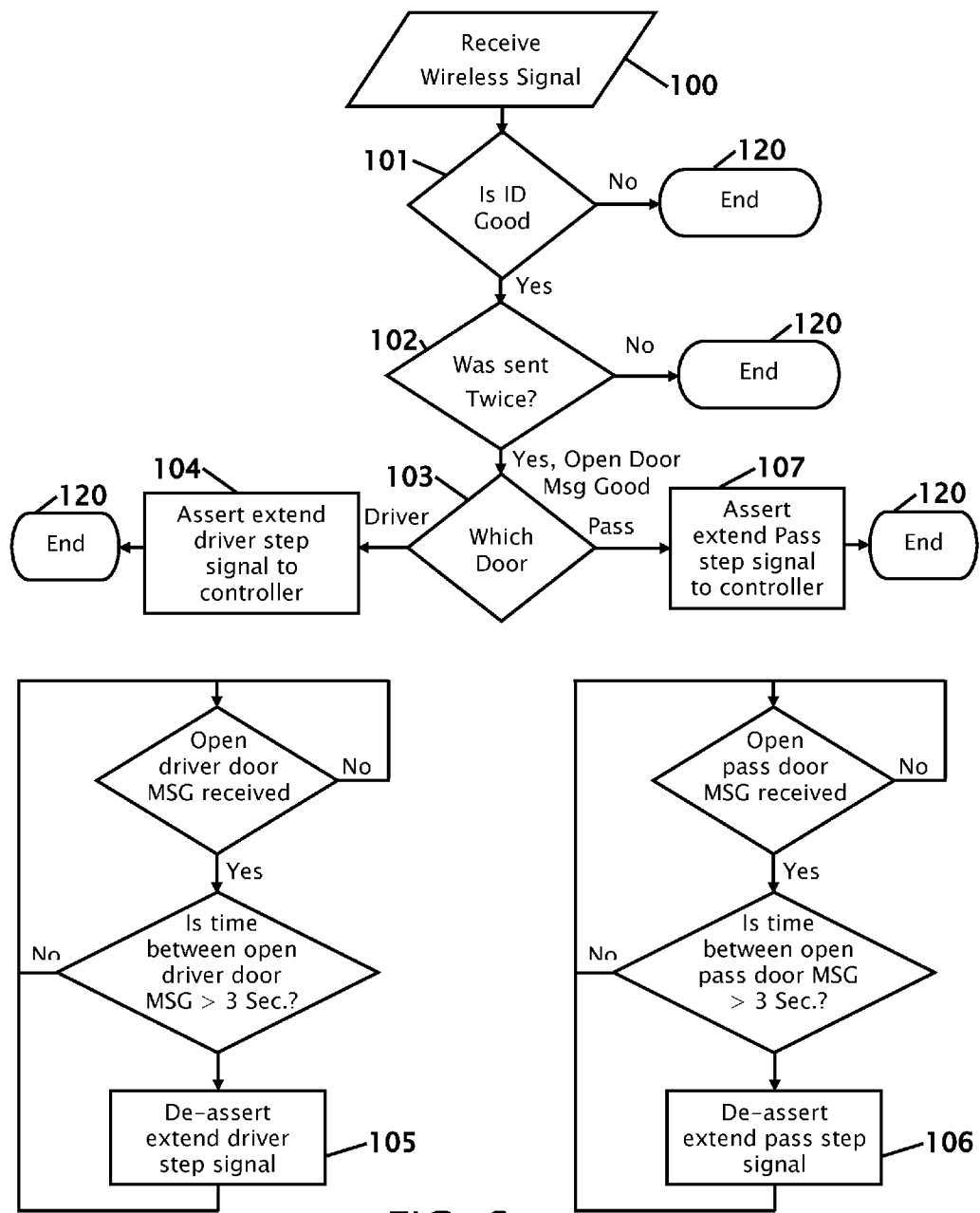
FIG. 6 shows a block diagram of the code flow chart in the receiver.

FIG. 6 shows a block diagram of the code flow chart in the receiver. The receiver/controller listens to receive the messages 100 and determines if the received signal and the ID is good and or valid 101. If the data is found to be invalid the microcontroller will not take any action and end 120 or return to a listen state. If the data is valid the microcontroller will further check to ensure that the command was sent twice 102. Again if this check shows that the data is not valid the process will end 120. Since that command is now considered valid the receiver will determine which door changed state 103 and will branch to either the driver 104 or passenger 107 door to determine the status of the door to command the controller to retract or extend 105, 106 the appropriate step. The four door transmitters, stores the message data, and determines the correct responses and end 120 or wait for an additional command. If a door on either side of the vehicle is open the receiver asserts the proper signal to the controller to engage the appropriate step motor and lower the step. A step will remain lowered until the receiver/controller receives messages indicating that both doors on a vehicle side are closed.

Thus, specific embodiments of a retractable truck step with wireless door sensor have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A retractable truck step with wireless door sensor comprising:
   at least one motor that extends and retracts at least one automated vehicle entrance and exit step;
   at least one automated vehicle entrance and exit step is placed at a driver side of said vehicle and at a passenger side of said vehicle;
   at least one sensor that detects the when a door is opened and or and closed;
   said sensor emitting a wireless signal to a receiver when said door is opened and closed, and
   a receiver that receives said emitted wireless signal to operate said motor.

2. The retractable truck step with wireless door sensor according to claim 1 wherein said sensor is a magnetic reed switch.

3. The retractable truck step with wireless door sensor according to claim 1 wherein said emitted wireless signal includes multiple transmission addresses.

4. The retractable truck step with wireless door sensor according to claim 1 wherein said emitted wireless signal transmits a redundant signal to said receiver.

5. The retractable truck step with wireless door sensor according to claim 1 wherein said wireless signal is sent at a timed interval to identify that the door is still open.

6. The retractable truck step with wireless door sensor according to claim 5 wherein said timed interval is 0.1 to 5 seconds.

7. The retractable truck step with wireless door sensor according to claim 1 wherein said transmitter stops transmitting door open signal after a finite period of time.

8. The retractable truck step with wireless door sensor according to claim 7 wherein said finite period of time is between one minute and 15 minutes.

9. The retractable truck step with wireless door sensor according to claim 5 wherein said receiver detects an absence of signals from said sensor.

10. The retractable truck step with wireless door sensor according to claim 9 wherein said absence of signals is between 0.5 seconds and five seconds.

11. The retractable truck step with wireless door sensor according to claim 1 wherein more than one at least one sensor is used.

12. The retractable truck step with wireless door sensor according to claim 1 wherein said separate sensors are placed at a driver door and at a passenger door of said vehicle.

13. The retractable truck step with wireless door sensor according to claim 1 wherein said separate sensors are placed at each driver side door and at each passenger side door of said vehicle.

14. The retractable truck step with wireless door sensor according to claim 1 wherein said wireless signal is at a frequency of 915 MHz.

15. The retractable truck step with wireless door sensor according to claim 1 wherein said wireless signal includes vehicle ID information.

16. The retractable truck step with wireless door sensor according to claim 1 wherein said sensors are magnetic door sensors.

17. The retractable truck step with wireless door sensor according to claim 1 wherein sensors are mounted on the edge of a door jamb.

18. The retractable truck step with wireless door sensor according to claim 1 that does not utilize a wired connection between said at least one sensor and a controller.

19. The retractable truck step with wireless door sensor according to claim 18 wherein said controller operates said at least one motor that extends and retracts said at least one automated vehicle entrance and exit step.

20. A retractable truck step with wireless door sensor comprising:
   at least one motor that extends and retracts at least one automated vehicle entrance and exit step;
   at least one automated vehicle entrance and exit step is placed at a driver side of said vehicle and at a passenger side of said vehicle;
   at least one sensor that detects the when a door is opened and or and closed;
   said sensor emitting a wireless signal to a receiver when said door is opened or closed, and a receiver that receives said emitted wireless signal to operate said motor.

\* \* \* \* \*